UNITED STATES PATENT OFFICE.

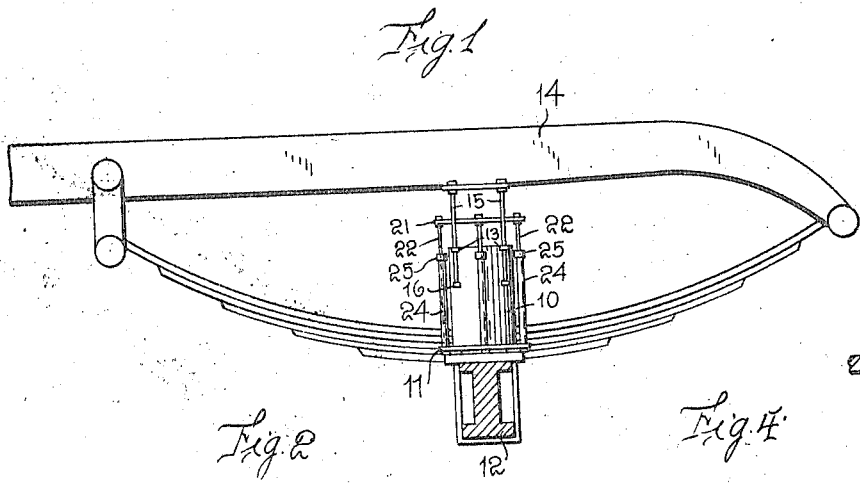
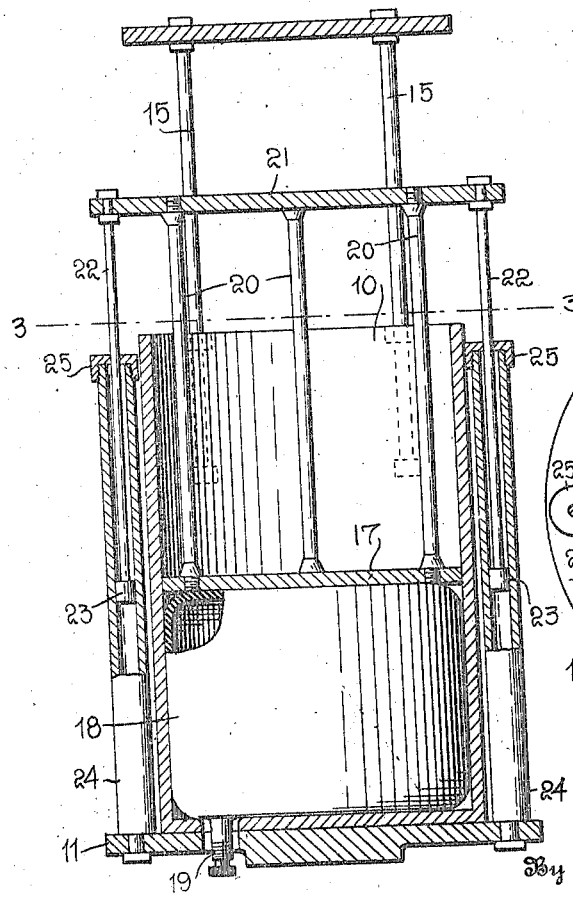
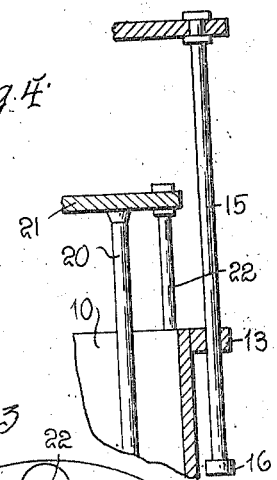
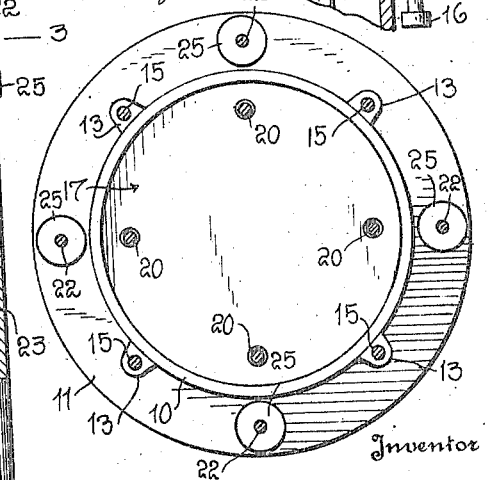

IRVIN J. ALBRIGHT, OF JOPLIN, MISSOURI.

SHOCK-ABSORBER FOR AUTOMOBILES.

1,257,950.

Specification of Letters Patent.

Patented Feb. 26, 1918.

Application filed September 15, 1917. Serial No. 191,615.

*To all whom it may concern:*

Be it known that I, IRVIN J. ALBRIGHT, a citizen of the United States, residing at Joplin, in the county of Jasper and State of Missouri, have invented certain new and useful Improvements in Shock-Absorbers for Automobiles, of which the following is a specification, reference being had to the accompanying drawings.

This invention relates to shock absorbers for automobiles and other vehicles, and particularly to that class of shock absorbers in which a piston operates against an air cushion.

The general object of this invention is to provide means whereby, in a shock absorber of this type, the piston will operate against this air cushion, both upon a movement of the body of the car toward the axle and upon a movement of the car body and the axle in relatively opposite directions.

A further object of the invention is to provide in a shock absorber of this class, a piston, a cylinder and a cushion formed of an envelop of flexible material and distended with air, this cushion being disposed in the bottom of the cylinder, and provide means whereby to secure a compression of the air cushion upon a relative movement of the car body and axle, either toward each other or away from each other.

Other objects will appear in the course of the following description.

My invention is illustrated in the accompanying drawings, wherein:—

Figure 1 is a side elevation of a portion of an automobile with the upper and lower spring elements thereof, the axle being in section, and my improved shock absorber in operative position;

Fig. 2 is a vertical section view through the shock absorber;

Fig. 3 is a section on the line 3—3 of Fig. 2;

Fig. 4 is a fragmentary vertical sectional view.

Referring to the drawings, 10 designates the cylinder of the shock absorber, which is operatively supported upon a base member 11, which in turn rests upon and is connected to the axle 12. This cylinder 10 perferably at its upper end, though not necessarily so, is provided with a plurality of guide eyes 13 and the body 14 of the automobile has extending down from it a plurality of rods 15 passing through said eyes and having enlarged heads 16, larger than the passage through the eyes, so that upon a predetermined upward movement of the body the heads of the rods 15 will engage with said eyes 13 and cause the upward movement of the cylinder 10 upon the upward movement of the body.

Disposed within the cylinder 10 is a piston or plunger 17, which fits this cylinder snugly and disposed between this piston or plunger and the bottom of the cylinder is an air cushion composed of an envelop 18 of fabric made gas tight or air tight in any suitable manner, this air bag, as it may be called, having a suitable inlet valve, whose casing 19 projects out through the end of the cylinder so that this cushion may be inflated. The piston 17 normally rests upon this cushion.

Extending upward from the piston 17 are a plurality of rods 20, which extend out through the top of the cylinder and are connected to a disklike member 21, which may extend at intervals beyond the walls of the cylinder, as illustrated in Fig. 2, and which is provided with a plurality of depending rods 22 having heads 23 at their lower ends. Extending upward from the base 11 are a plurality of tubular rods 24 into which the rods 22 telescope, these tubular rods at their upper end being partially closed as at 25, this end wall, however, being perforated for the passage of the rod 22. In other words, the sections 22 and 24 have telescopic engagement with each other for a limited movement.

The operation of this invention is as follows: The body 14 when depressed bears upon the disklike member 21, and the lower end of the cylinder 10 rests upon the base member 11. Now upon a jolt or jar which causes the body of the automobile to move toward the axle, the piston 17 will be forced inward against the cushion 18 by the downward movement of the body, while the end wall of the cylinder will be forced toward the piston by the upward movement of the axle, thus compressing the air cushion between the piston and the end wall of the cylinder. Upon a movement of the parts, however, in the opposite direction, that is, when the axle moves downward and the body moves upward, then the rods 15 moving upward engage with the eyes or guides 13, so that the upward movement of the body 14 acts to draw the cylinder 10 upward and at the same time the downward movement of the axle causes the upper ends of the tubular sections 24 to engage the heads 23 and thus draw downward upon the disk 21 and downward upon the rods 20 and the plunger 17, so that here, though the movement of the body and the axle are in relatively opposite directions, yet the piston and the cylinder move toward each other and the air cushion is compressed. I thus secure a compression of the air cushion upon a relative movement of the body and axle in opposite directions.

In Fig. 1 of the drawings the body of the vehicle is represented by one element thereof, namely, the usual frame beam, and in the drawings this frame beam 14 is not shown as bearing upon the member 21 but as engaging with this member 21 upon a relative depression of the body and a relative elevation of the axle. This gives a certain range of movement before the piston commences to move inward upon a downward movement of the body and an upward movement of the axle, but it is obvious that the body or the member 14 may rest directly upon the disk 21 and also that the lengths of the members 15, 22 and 24 may be altered so as to secure a more immediate reaction of the shock absorber to the movement of the vehicle.

It is to be understood that the mechanism which I have shown in my drawings is purely illustrative, as it is obvious that the invention may be embodied in many different forms, depending upon the type of car to which the device is to be applied and the range of movement between the body and the axle. The sliding connection between the rods 15 and the cylinder 10 and between the section 24 and the section 22 permits small oscillations of the body and axle but as soon as large oscillations are set up, the air cushion operates to yieldingly resist the movement of the parts and cushion the jolt which would otherwise be given to the car body. Thus, while I have illustrated my invention in the accompanying drawings as used in conjunction with a vehicle spring, it is to be clearly understood that my improved shock absorber may be employed in lieu of or as a substitute for such springs, the latter being entirely dispensed with.

Having described my invention, what I claim is:—

1. The combination with two elements movable toward or away from each other, of a shock absorber comprising a cylinder and a plunger acting against an air cushion in the cylinder on one side of the plunger, and means for causing a relative movement of the plunger and cylinder to compress the air cushion upon a movement of the elements either toward each other or away from each other.

2. The combination with a vehicle including a body and an axle, of a shock absorber including a cylinder arranged to be moved toward the body by the axle, a piston operating against an air cushion in said cylinder between the axle and piston, means arranged to be directly engaged by the body for moving the piston toward the axle, whereby upon relative movement of the axle and body toward each other the air cushion is compressed, and means connecting the axle with the piston and the body with the cylinder to cause a relative movement of the piston and cylinder to compress the air cushion upon a relative movement of the axle and body away from each other.

3. The combination with two elements relatively movable toward or from each other, of a shock absorber disposed between said elements and comprising two compressing members operating against an air cushion, means for causing a relative movement of the compressing members to compress the cushion upon a relative movement of the elements toward each other, and means for causing a relative movement of the compressing members to compress the air cushion upon a relative movement of the elements away from each other.

4. The combination with two elements movable toward or from each other, of a shock absorber disposed between the elements and comprising a cylinder abutted against one of said elements and movable with it toward the other element, a piston, a yieldable cushion disposed in the cylinder body between the piston and said element, and means arranged to be abutted by the other element for moving the piston toward the first named element, whereby upon relative movement of the elements toward each other the cushion is compressed, operative connections between the other element and the cylinder and having sliding lost motion engagement with the cylinder, and means extending from the first named element and having sliding lost motion connection with the piston, whereby a relative movement of the elements away from each other causes a relative movement of the piston and cylinder to compress the cushion.

5. The combination with a vehicle including a body and an axle, of a shock absorber comprising a cylinder, a piston operating against an air cushion in said cylinder, and means connecting the piston to the axle and the cylinder to the body to cause a relative movement of the piston and cylinder to compress the air cushion upon a relative movement of the body and axle either toward or away from each other.

6. The combination with two elements relatively movable toward and away from each other, of a shock absorber disposed between said elements and comprising a cylinder and a piston operating against an air cushion in said cylinder, direct connections between one of said elements and the cylinder and between the other of said elements and the piston to cause relative movement between the piston and cylinder to compress the air cushion upon relative movement of the elements toward each other and also upon continued relative movement of said elements away from each other after a predetermined extent of relative movement of said elements away from each other.

7. The combination with two elements relatively movable toward or away from each other, of a shock absorber disposed between said elements and comprising opposed compression members operating against an air cushion between said members, means causing a relative movement between the piston and cylinder to compress the air cushion upon relative movement of the elements toward each other after a predetermined extent of relative movement of said elements toward each other, and means to cause relative movement between the compression members to compress the air cushion upon a continued relative movement of the elements away from each other after a predetermined extent of relative movement of said elements away from each other.

In testimony whereof I hereunto affix my signature in the presence of two witnesses.

IRVIN J. ALBRIGHT.

Witnesses:
HOWARD H. DOUGLAS,
K. W. STORY.